3,280,553
FUEL SUPPLY CONTROL SYSTEMS FOR GAS TURBINE ENGINES

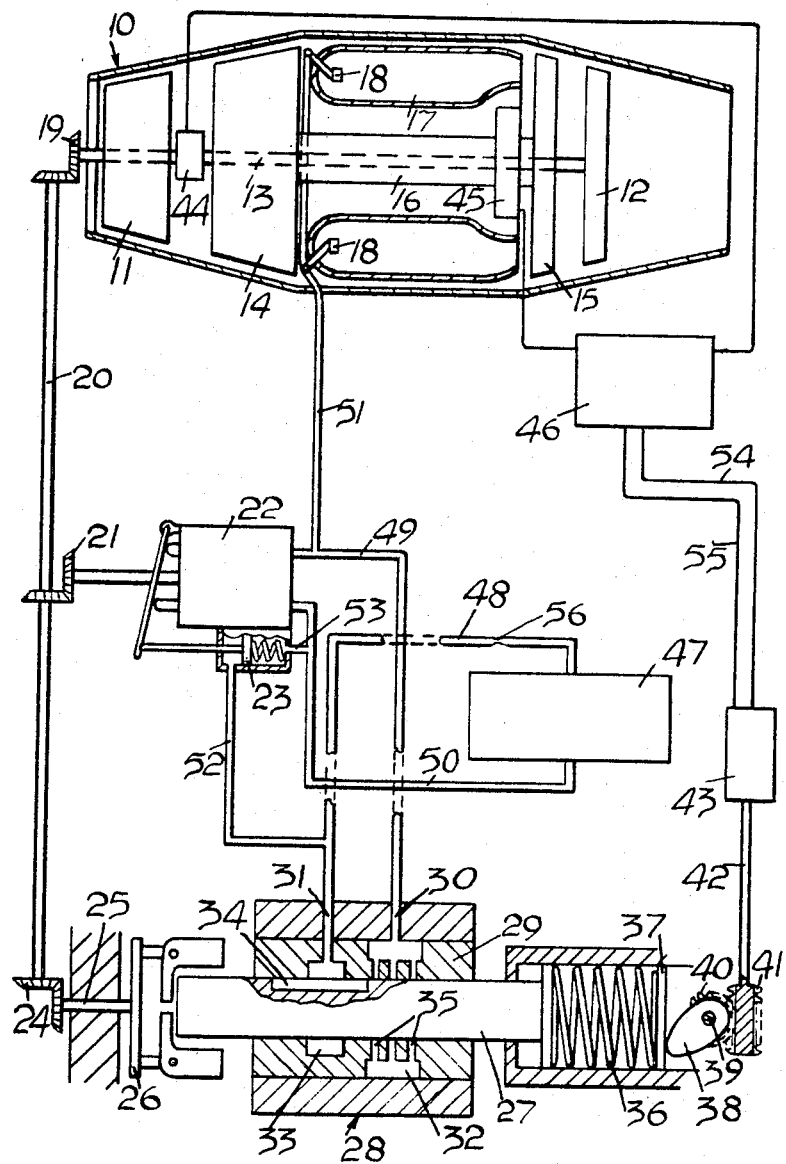

John Michael Crispin Young, Solihull, England, assignor to Joseph Lucas (Industries) Limited, Birmingham, England
Filed Feb. 10, 1964, Ser. No. 343,605
Claims priority, application Great Britain, Feb. 22, 1963, 7,198/63
2 Claims. (Cl. 60—39.16)

This invention relates to fuel supply control systems for gas turbine engines of the kind including at least one compressor, and a pair of turbines mounted respectively upon a pair of independently rotatable shafts.

In such engines, it is often inconvenient to apply a governor, for controlling the supply of fuel to the engine, to each of the shafts and the object of the present invention is provide a fuel supply control system for an engine of the kind specified in a convenient form whereby the necessity for utilising a pair of governors is obviated.

According to the invention, a fuel supply control system for a gas turbine engine of the kind having at least one compressor and a pair of turbines mounted respectively upon a pair of independently rotatable coaxial shafts of the engine, a governor drivingly connected to one of said shafts and operable in response to the speed of said one shaft to regulate the supply of fuel to the engine, and a pair of electrical speed signal generators associated one with each of the pair of shafts respectively, and means operable, in dependence upon the difference in the signals produced by said pair of generators, to vary the response of the governor to the speed of said one shaft.

One example of the present invention is illustrated diagrammatically in the accompanying drawing.

In this example, there is provided a gas turbine engine 10 of the kind comprising a first, low pressure compressor 11 an a turbine 12 mounted on a shaft 13, a second, high pressure compressor compressor 14 and a further turbine 15 mounted on a tubular shaft 16 which surrounds the shaft 13 between the compressor 11 and turbine 12, and one or more combustion chambers 17 arranged to receive compressed air, for combustion, from the compressors and to discharge products of combustion through the turbines. Inside the combustion chamber or chambers, are burner nozzles 18 which are supplied with liquid fuel as will be more fully described.

The shaft 13 carries one of a pair of meshing bevel gears 19, the other gear of the pair being carried on a shaft 20 which extends transversely to the shaft 13. A further pair of bevel gears 21 transmit the drive to a pump 22 which is of the swash-plate type and has a switch-plate which is variable by means of a servo-mechanism shown diagrammatically at 23.

The shaft 20 carries a still further bevel gear 24 forming one of a pair, the meshing gear being mounted on a shaft 25 which carries a flyweight governor diagrammatically indicated at 26. The action of the governor 26 is to transmit sliding motion to a spindle 27 of a valve unit 28 which comprises a body 29 having inlet and outlet passages, 30 and 31, respectively opening into annular compartments 32 and 33 in the body. The compartments 32 and 33 are in communication with one another through a slot 34 formed in the spindle 27, the arrangement being such that sliding movement of the spindle 27 with increasing speed of the shaft 25 moves the slot 34 into communication with one or more of three passages 35 in the body 29, these passages 35 communicating with the compartment 32. Thus the greater the speed of the shaft 25, which is, of course, directly driven by the engine 10, then the greater will be the sliding movement of the shaft 27 to expose an increasing number of the passages 35 for flow of fluid between the inlet 30 and the outlet 31 of the valve unit 28. The governor 26 is, however, opposed by a compression spring 36 which acts on the end of the shaft 27 remote from the governor 26 tending to move the spindle 27 into a position in which the passages 35 are all out of register with the slot 34 in the spindle 27 (this being the position shown in the drawing and normally obtaining when the engine is at rest).

The spring 36 abuts against an end plate 37 which is engaged by a rotatable cam 38. A spindle 39 which carries the cam 38 also carries a gear 40 meshing with a worm 41 mounted on a spindle 42 of an electric motor 43. Thus energising of the motor (which may be replaced by a solenoid) causes the worm 41 to rotate thus rotating the cam 38 and varying the prestressing of the spring 36. The motor 43 is energised by a signal received in the following way. On each shaft 13 and 16 of the engine 10 is a signal generator 44 and 45 respectively and the signals produced by these two generators 44, 45 are compared in a comparison device 46 and when the speed of the shaft 16 as a proportion of its permitted maximum, exceeds that of the shaft 13, also as proportion of its permitted maximum, the comparison device 46 produces a signal which operates the motor 43, through the circuit indicated by 54. The magnitude of the difference in signals from the generators 44 and 45 is a function of the difference in the proportion of the speeds of the shafts 13 and 16. A feed back circuit 55 prevents movement of the motor 43 beyond that initiated by the comparison device in the first instance, since the engine responds more slowly to the change in the supply of fuel than the comparison device does to the difference in the signals from generators 44 and 45.

The fuel system for supplying the burner nozzles 18 includes the pump 22, which is supplied from a reservoir 47, and the valve unit 28. A conduit 50 leads from the reservoir 47 to the pump 22 and another conduit 49 leads from the pump to the valve unit 28 with a branch conduit 51 to the burner nozzles 18. A further conduit 48 leads from the valve unit 28 to the reservoir 47 for return of fuel to the reservoir, through the restriction 56 depending upon the position of the spindle 27 of the valve unit 28. Bypass conduits 52 and 53 connect the two sides of the servo mechanism 23 with the conduits 48 and 50 respectively.

In operation, when the speed of the shaft 13 reaches a predetermined value, the fuel supply to the nozzles 18 is reduced by allowing spill to take place through the valve unit 28, but when the shaft 16 reaches a speed proportionally in excess of that of the shaft 13, a signal is produced to modify the effect of the governor 26 to reduce the speed at which the governor reduces the supply of fuel to the nozzles 18. The signals are derived from the speeds of the shafts 13 and 16 by comparing signals from the generators 44 and 45 in the device 46. When the signal from the generator 45 exceeds that from the governor 44, this device 46 produces an output signal which energises the motor 43 and there is thus produced a mechanical movement which is used to reduce the prestress in the spring 36, by means of the worm 41, gear 40 and cam 38. This variation in the prestressing of the spring 36 modifies the effect of the governor 26, which is driven from the shaft 13 of the engine 10 thus controlling the flow of fuel back to the reservoir 47 from the pump 22 through the valve unit 28. This in turn, varies the flow of fuel to the burner nozzles 18.

It is to be understood, however, that the mechanical movement produced in response to the electrical signals from the generators 44 and 45 may be employed in other ways to vary flow of fuel to the nozzles 18. Other forms of mechanical or hydromechanical governors could be used to throttle or to spill fuel or to vary the capacity of a pump. The means for adjusting the governor may include a difference amplifier for comparing the signals from the generators 44 and 45 and means such as a motor or a solenoid which is operable by the difference amplifier output may be employed to modify the governor. It is also to be understood that the mechanical governor could be driven from the shaft 16, where appropriate and the system would operate in a similar manner to that described.

Having thus described my invention what I claim as new and desire to secure by Letters Patent is:

1. A fuel control system for a gas turbine engine of the kind having at least one compressor and a pair of turbines mounted respectively upon a pair of independently rotatable coaxial shafts of the engine, a governor drivingly connected to one of said shafts and operable in response to the speed of said one shaft to regulate the supply of fuel to the engine, and a pair of electrical speed signal generators associated one with each of the pair of shafts respectively, and means operable, in dependence upon the difference in the signals produced by said pair of generators, to vary the response of the governor to the speed of said one shaft.

2. A fuel control system for a gas turbine engine of the kind having at least one compressor and a pair of turbines mounted respectively upon a pair of independently rotatable coaxial shafts in the engine, a mechanical governor drivingly connected to one of said shafts and operable in response to the speed of said one shaft, a valve, the position of which is controlled by said governor, said valve being arranged to regulate the quantity of fuel supplied to the engine, and a pair of electrical speed signal generators one associated with each of the pair of shafts respectively, and a comparison device arranged to compare the signals produced by said generators and to produce an output signal dependent upon the difference in the signals, and a device to which the output signal is supplied to vary the response of the governor to the speed of said one shaft.

References Cited by the Examiner

UNITED STATES PATENTS

| | | | |
|---|---|---|---|
| 2,880,580 | 4/1959 | Wallace et al. | 60—39.28 |
| 3,186,165 | 6/1965 | Edkins | 60—39.16 X |

JULIUS E. WEST, *Primary Examiner.*